No. 619,320. Patented Feb. 14, 1899.
C. W. LARSON.
TROLLEY.
(Application filed Oct. 31, 1898.)
(No Model.)

WITNESSES.
A. Ernst Allenpolz.
A. F. Macdonald.

INVENTOR.
Carl W. Larson.
by Albert G. Davis
Att'y.

THE NORRIS PETERS CO., PHOTO-LITHO., WASHINGTON, D. C.

UNITED STATES PATENT OFFICE.

CARL W. LARSON, OF SCHENECTADY, NEW YORK, ASSIGNOR TO THE GENERAL ELECTRIC COMPANY, OF NEW YORK.

TROLLEY.

SPECIFICATION forming part of Letters Patent No. 619,320, dated February 14, 1899.

Application filed October 31, 1898. Serial No. 694,990. (No model.)

*To all whom it may concern:*

Be it known that I, CARL W. LARSON, a subject of the King of Sweden and Norway, residing at Schenectady, in the county of Schenectady and State of New York, have invented certain new and useful Improvements in Trolleys, (Case No. 925,) of which the following is a specification.

The present invention relates to trolleys or traveling collecting devices, and more particularly to that type in which the trolley is mounted on the roof of an electrically-propelled vehicle and arranged to be operated from the interior thereof.

The object of the present invention is to provide means whereby the trolley may be operated from more than one point in the interior of the vehicle on which the trolley is carried.

In the arrangement of apparatus hereinafter described in connection with the accompanying drawings I have shown the invention as applied to the operation of a plurality of trolleys; but it is to be understood that the invention is not limited in its application to any particular number.

Figure 1:
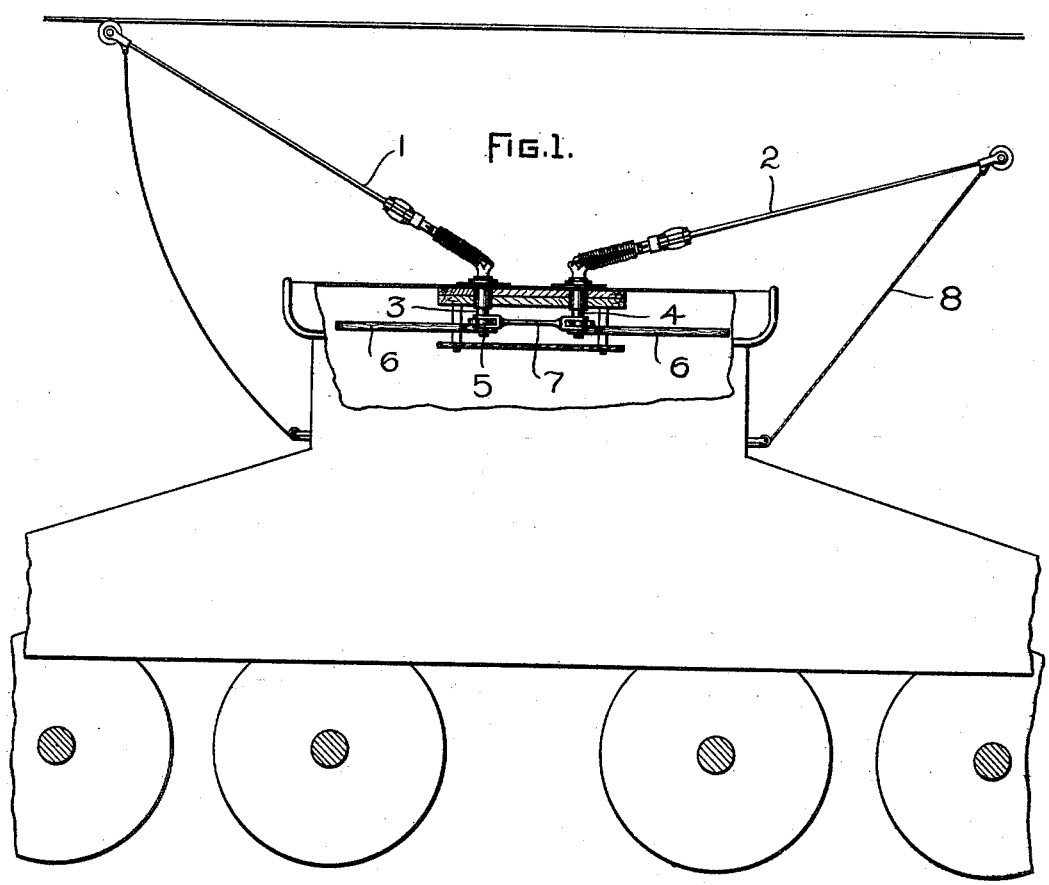
Figure 2:
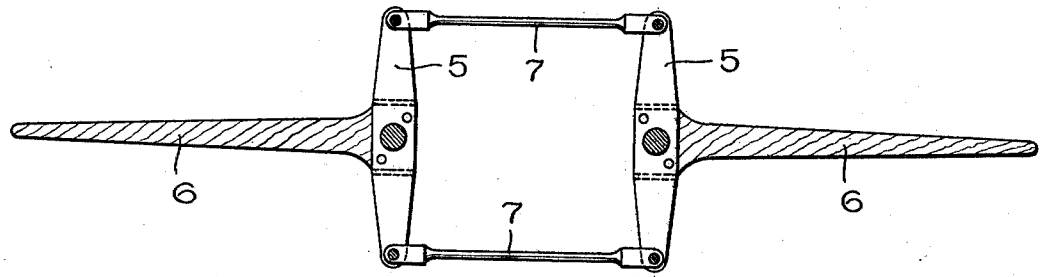

In the drawings, Figure 1 shows my invention as applied to the operation of a plurality of trolleys. Fig. 2 shows the trolley-operating levers and connections.

In Fig. 1 I have shown in diagram the cab and body of an electric locomotive as illustrative of an electrically-propelled vehicle of any type receiving its current through any suitable collecting device or trolley. In the present instance trolleys 1 2 are shown as mounted on the roof of the cab. The trolleys are of the underrunning type, having suitable spring-actuating mechanism for urging the trolley-wheels into contact with the under side of the overhead-trolley wire. As my invention has no special reference to the variety of trolley employed, I may use any desired form. The trolleys are mounted on rotating bases having vertical shafts 3 4, extending through the roof of the vehicle and projecting into its interior. Upon each of the shafts 3 4 is mounted a cross-bar 5, having bolted thereto an operating handle or lever 6, as shown more clearly in Fig. 2. The cross-bars 5 of the individual trolleys are operatively connected together by links 7, the links being pivoted to the ends of the cross-bars, as shown.

It is evident that the operation of either handle 6 is communicated through the links 7 to the cross-bar 5, connected to the other handle 6. Either trolley may therefore be operated by either handle desired, and the handle which is to be used depends simply upon the choice of the operator. In the normal operation of the two trolley equipments such as shown the forward trolley is generally pulled down out of operation by means of the trolley-cord 8, although, if desired, both trolleys may be employed together by reversing the forward trolley and causing it to trail in the same manner as the trolley associated therewith. This is sometimes desirable when large currents are to be collected. To effect this purpose, the trolleys should be of the type such as shown, for example, in the drawings, in which the inclination of the trolley-pole may be reversed from forward to backward, or vice versa, without appreciably rotating the trolley-base. As this type of trolley is well known in the art, no detailed description of the same is deemed necessary.

What I claim as new, and desire to secure by Letters Patent of the United States, is—

1. The combination of a plurality of trolley-poles each mounted on a rotatable base, an operating-lever for each trolley and mechanical connections between the levers.

2. The combination of a plurality of trolley-poles, each mounted on a rotatable base, shafts projecting from said bases, a cross-bar on each shaft and links connecting said cross-bars.

3. The combination of a plurality of trolley-poles, each mounted on a rotatable base, a shaft projecting from each base, an operating-lever connected to each shaft, and connections between said levers.

4. The combination of a plurality of trolley-poles carrying contact-wheels adapted to engage the same trolley-wire and means for simultaneously moving said wheels out of or into the plane of the said trolley-wire.

In witness whereof I have hereunto set my hand this 28th day of October, 1898.

CARL W. LARSON.

Witnesses:
B. B. HULL,
M. H. EMERSON.